United States Patent [19]

Hayashi et al.

[11] Patent Number: 5,022,501
[45] Date of Patent: Jun. 11, 1991

[54] HYDRAULIC TYPE VEHICLE HEIGHT ADJUSTING DEVICE FOR ATTACHMENT TO VEHICLE SHOCK ABSORBER

[75] Inventors: Yasuyuki Hayashi, Fukuroi; Shigenobu Abe, Hamamatsu, both of Japan

[73] Assignee: Kabushiki Kaisha Showa Seisakusho, Japan

[21] Appl. No.: 409,463

[22] Filed: Sep. 19, 1989

[30] Foreign Application Priority Data

Sep. 21, 1988 [JP] Japan .......................... 63-122787[U]

[51] Int. Cl.$^5$ ............................................. F16F 5/00
[52] U.S. Cl. ..................................... 188/300; 188/285; 188/321.11; 267/64.12; 267/64.16
[58] Field of Search ................... 267/218, 64.28, 64.16, 267/64.12, D1, D2, D3; 188/300, 285, 299, 321.11, 285, 283, 266; 280/704, 714, 840

[56] References Cited

U.S. PATENT DOCUMENTS

| | | | |
|---|---|---|---|
| 3,177,980 | 4/1965 | Porter | 188/300 |
| 3,739,885 | 6/1973 | Bainbridge | 188/300 |
| 3,966,182 | 6/1976 | Stadelmann et al. | 188/300 |
| 4,159,105 | 6/1979 | Vander Laan et al. | 267/218 |
| 4,245,826 | 1/1981 | Wirges | 188/300 |
| 4,667,941 | 5/1987 | Hayashi et al. | 267/64.16 |

Primary Examiner—Matthew C. Graham
Attorney, Agent, or Firm—Kane, Dalsimer, Sullivan, Kurucz, Levy, Eisele and Richard

[57] ABSTRACT

A hydraulic type vehicle height adjusting device for a vehicle shock absorber. The device has a mechanical locking means for holding relative positions before and after adjustment in vehicle height between the piston rod of the shock absorber and one of the mounting members for attaching the above absorber to the axle or the vehicle body.

3 Claims, 5 Drawing Sheets

FIG. 1
FIG. 2
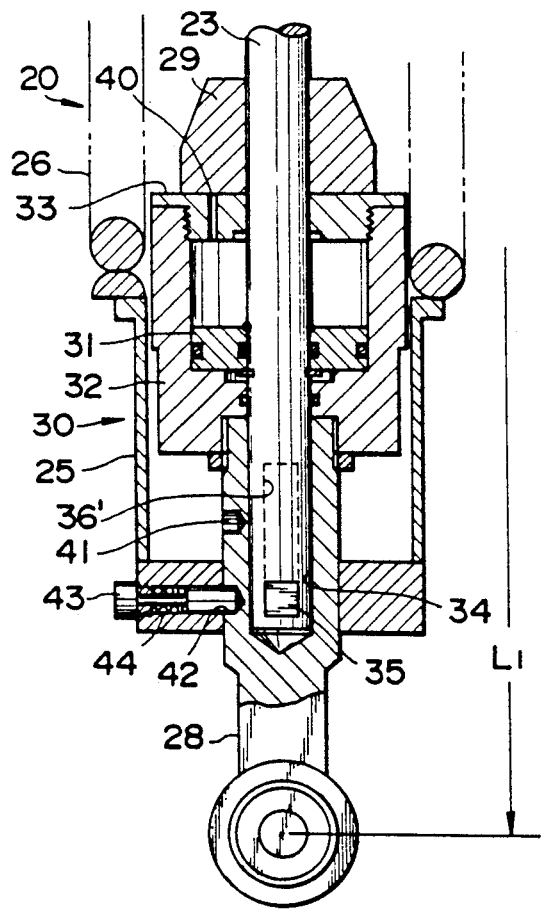
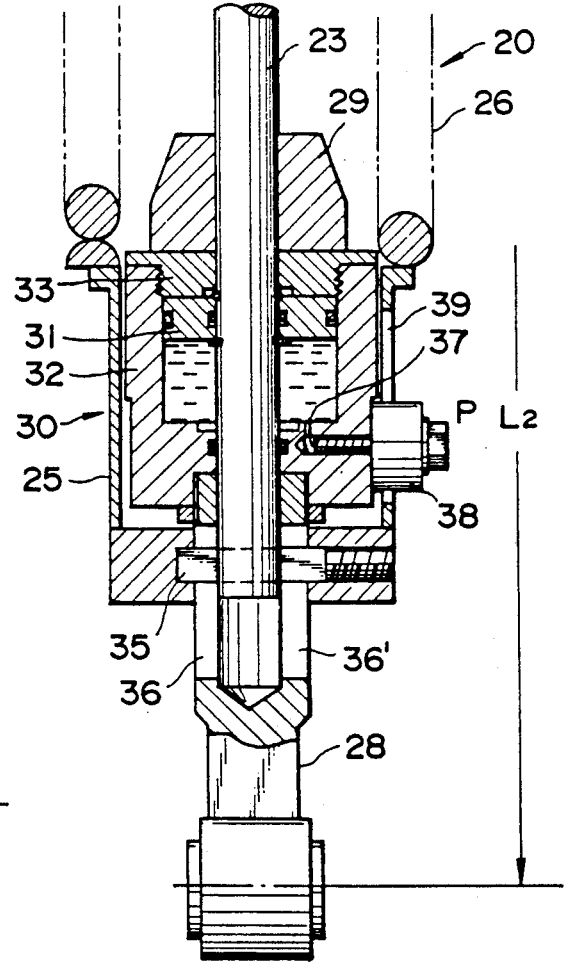

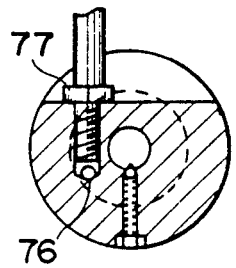
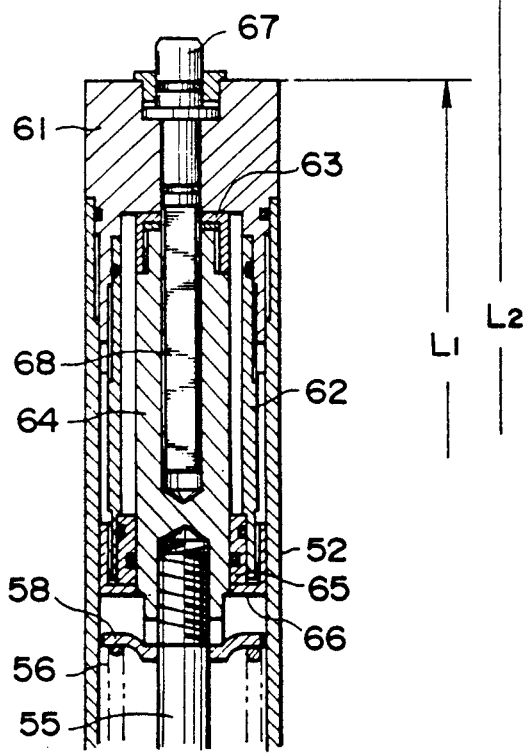
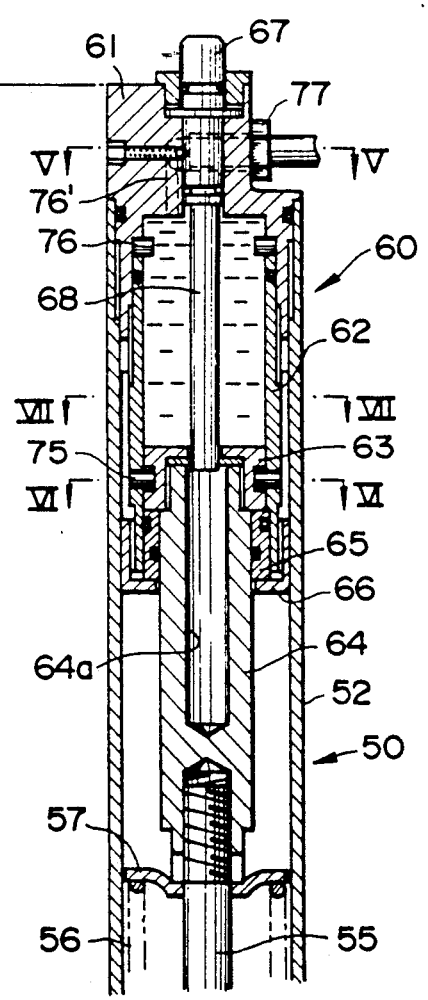

FIG. 6
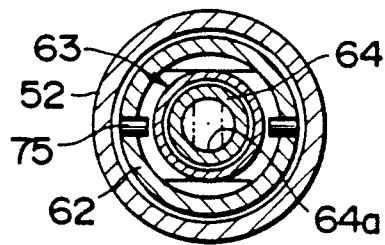
FIG. 8
FIG. 7
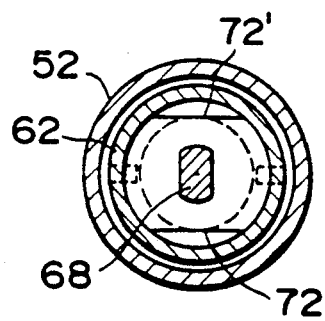
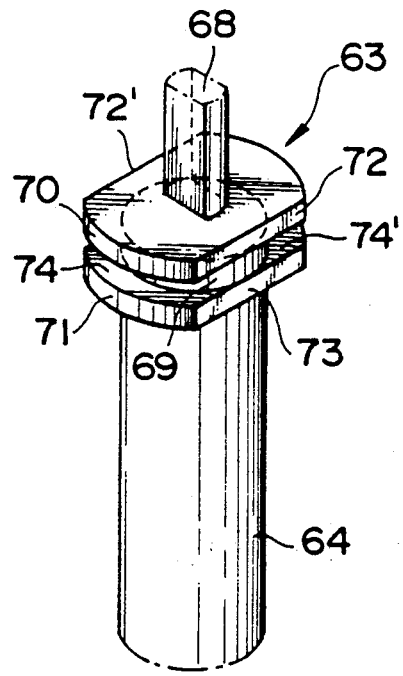

PRIOR ART

HYDRAULIC TYPE VEHICLE HEIGHT ADJUSTING DEVICE FOR ATTACHMENT TO VEHICLE SHOCK ABSORBER

BACKGROUND OF THE INVENTION

The present invention relates to a hydraulic type vehicle height adjusting device for a vehicle shock absorber.

Such a kind of hydraulic type vehicle height adjusting device is publicly known for example from U.S. Patent No. 4,159,105. FIGS. 10 and 11 are schematic views of the shock absorber having the vehicle height adjusting device in the above mentioned prior art. In the drawings, reference character 1 designates a damper cylinder, 2 a piston, 3 a piston rod, 4 a suspension spring, 5 a rebound spring, 6 a stopper rubber, and 7 a member which is connected to the piston rod 3 and formed with a vehicle height adjusting cylinder 11 at the peripheral portion thereof. Reference character 8 designates a mounting member for attaching the shock absorber to the body of a motorcycle, 9 a mounting member for attaching the shock absorber to the axle of the motorcycle, and 10 a vehicle height adjusting piston which supports one end of the suspension spring 4 and which is slidably moved up and down within the vehicle height adjusting cylinder. FIG. 10 illustrates the shock absorber for the motorcycle with a weight of a rider thereon which is not adjusted in vehicle height and this normal vehicle height is advantageously used for driving the motorcycle on the streets. FIG. 11 shows a position where adjustment in vehicle height is made to drive the motorcycle on a waste land from the position shown in FIG. 10. That is, when the vehicle height adjusting cylinder 11 formed in the peripheral portion of the member 7 is supplied with hydraulic fluid, the vehicle height adjusting piston 10 is displaced upwardly and the initial preset load of the suspension spring becomes greater, but since the live load remains unchanged, the load applied to the suspension spring is same as the load before increase in vehicle height. Accordingly, the piston rod 3 is drawn out from the damper cylinder 1 by the amount of displacement of the vehicle height adjusting piston 10 so that the vehicle height increases from $L_1$ to $L_2$. This increases the initial preset load of the suspension spring with the result that the spring load after increase in vehicle height per the amount of the same stroke becomes greater and this gives the motorcycle rider a rigid ride. Further, since the total stroke lt of the shock absorber remains unchanged after increase in vehicle height, even if increase in vehicle height is performed when the motorcycle has entered into a waste land, the shock absorber can not absorb any greater shock.

BRIEF SUMMARY OF THE INVENTION

Accordingly, it is an object of the invention to provide a hydraulic type vehicle height adjusting device for a vehicle shock absorber, in which when increase in vehicle height has been made, the initial preset load of the suspension spring remains unchanged and at the same time the stroke of the shock absorber becomes longer, and the mounting length thereof further remains unchanged when the shock absorber has been compressed to the minimum length.

According to one aspect of the invention, there is provided a hydraulic type vehicle height adjusting device for a vehicle shock absorber, having a mounting member for attaching the shock absorber to an axle or a vehicle body which is provided for displacement through hydraulic medium relative to a piston rod and a spring bearing connected to the piston rod of the vehicle shock absorber, wherein at least one of the piston rod of the shock absorber and said mounting member for attaching the shock absorber to the axle or the vehicle body has a mechanical locking means for holding a relative position between the piston rod and one of the mounting members. Since the hand-operated hydraulic type vehicle height adjusting device for the vehicle shock absorber is constituted so as to be displaced through hydraulic medium relative to the piston rod and the spring bearing connected thereto, the vehicle height and the stroke may be varied by the same amount without changing the initial preset load of the suspension spring and the mounting length compressed to the minimum. Further, it is ensured that the mechanical locking means attached to the shock absorber can reliably fix relative positions between the piston rod and the mounting member.

Also in the vehicle height adjusting device for the front fork of a motor cycle as set forth in claim 2, means for holding positions before and after adjustment in vehicle height also ensures the reliable holding of the relative position between the piston rod and the member at the side of the inner or outer tube.

In the hand operated hydraulic type vehicle height adjusting device as set forth in claim 5, since the piston rod is of double rod type construction in which the piston rod is passed through the vehicle height adjusting cylinder, the latter is advantageously supported at two points on the upper and lower walls thereof in every displaced positions of the vehicle height adjusting piston and the mounting member, and the transverse force may be dispersed, as compared with one rod type construction.

Since a vehicle height adjusting device as set forth in claim 6 is provided with a means for releasing the hydraulic fluid lock in a pipe line communicating both of the oil chambers within the front fork and the rear cushion, both of the vehicle height at the front fork and the rear cushion can be lowered at the same time by pressing the button for releasing the oil pressure lock.

Since the chamber opposite to the hydraulic fluid chamber within the vehicle height adjusting cylinder defined by the vehicle height adjusting piston is opened into atmosphere in the device as set forth in claim 6, when a rider desires to lower the vehicle height, the fluid within the hydraulic fluid chamber can be discharged by his own weight, which accordingly dispenses with only one port and also dispenses with only one pipe joint for hydraulic piping which protrudes through the axial notch of the spring bearing so that decrease in strength of the spring bearing may be avoided.

BRIEF DESCRIPTION OF THE DRAWINGS

Other objects and aspects of the invention will become apparent from the following description of embodiments with reference to the accompanying drawings in which:

FIG. 1 is a fragmentary sectional view of a rear cushion having a vehicle height adjusting device according to the invention, FIG. 2 is a fragmentary sectional view illustrating a position where the rear cushion in FIG. 1 is increased in vehicle height;

FIG. 3 is a fragmentary sectional view of a front fork having a vehicle height adjusting device according to the invention;

FIG. 4 is a fragmentary sectional view showing a position where the front fork in FIG. 3 is increased in vehicle height;

FIG. 5 is a cross-sectional view taken along the line V—V of FIG. 4;

FIG. 6 is a cross-sectional view taken along the line VI—VI of FIG. 4;

FIG. 7 is a cross-sectional view taken along the line VII—VII of FIG. 4;

FIG. 8 is a perspective view of a vehicle height adjusting piston of FIG. 4;

DETAILED DESCRIPTION OF THE PREFERRED EMBODIMENTS

FIGS. 1 and 2 each illustrate a lower portion of a rear cushion 20 of a motorcycle having a hand-operated hydraulic type vehicle height adjusting device according to the invention. The section shown in FIG. 2 is a section which makes an angle of 90° with respect to the section shown in FIG. 1.

Figure 9:
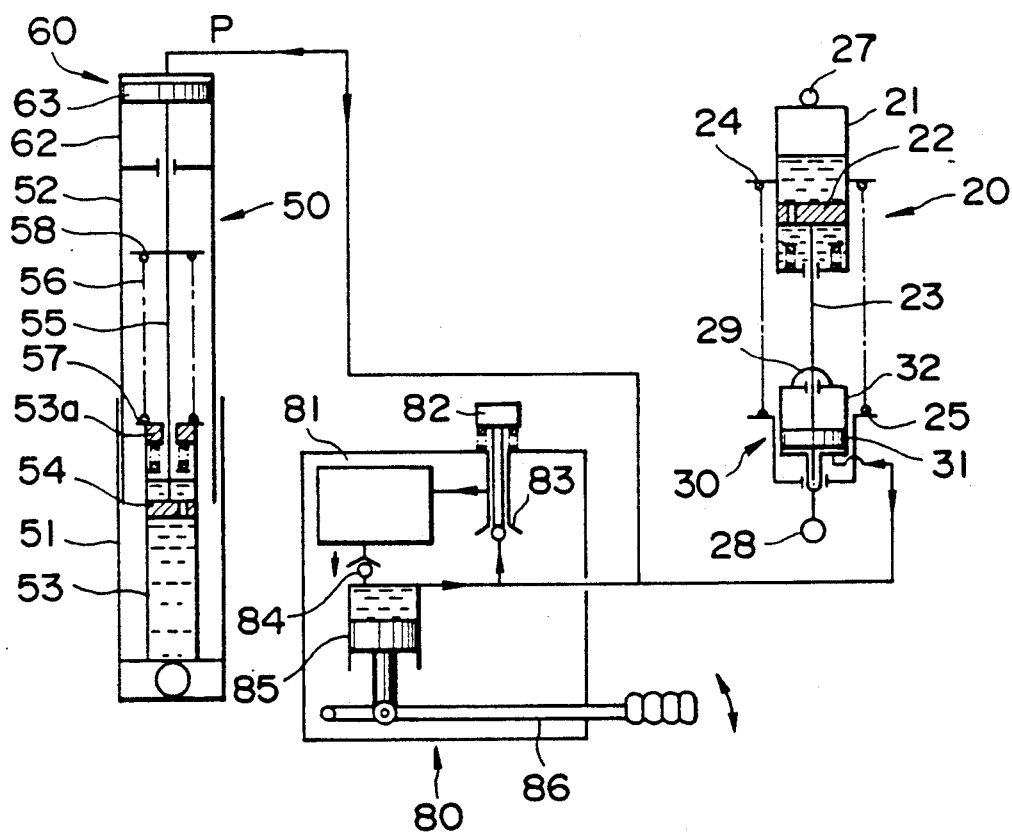
FIG. 9 is a connection diagram between a hand-operated hydraulic jack and the respective hydraulic jacks provided in a front fork and a rear cushion of a motorcycle to effect adjustment in vehicle height thereof.
Figure 10:
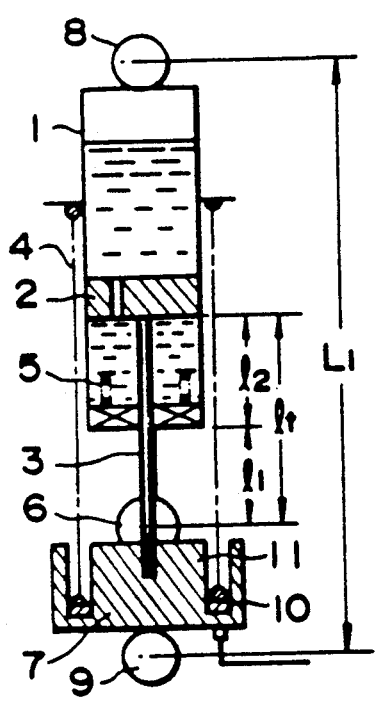
FIG. 10 is a schematic view of a rear cushion provided with a conventional vehicle height adjusting device showing a position of the rear cushion before increase in vehicle height of the motorcycle with a rider thereon.
Figure 11:
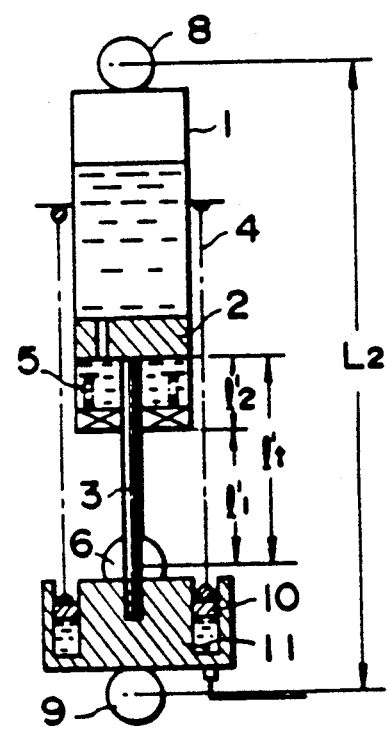
FIG. 11 is a schematic view illustrating a position of the rear cushion in FIG. 10 after increase in vehicle height.

This rear cushion 20 has a piston rod 23 protruding from a piston 22 instead for sliding movement within a damper cylinder (refer to FIG. 9). A suspension spring 26 is arranged between an upper bearing 24 fixedly secured to the damper cylinder 21 and a lower spring bearing 25. Reference character 27 designates a mounting member for attaching the rear cushion to the vehicle body, 28 a mounting member for attaching the rear cushion to the axle and 29 a damper rubber.

The hand-operated hydraulic type vehicle height adjusting device 30 basically consists of a vehicle height adjusting piston 31 secured to the piston rod 23, and a vehicle height adjusting cylinder 32 fitted in the piston 31. The vehicle height adjusting cylinder 32 is closed at the upper opening by a lid member 33 and has at the lower end a mounting member 28 for attaching the rear cushion to the axle of the motorcycle and threadably secured to the cylinder 32. The mounting member 28 for attaching the rear cushion to the axle 28 is formed in the center thereof wIth a bore 34 in which the piston rod 23 is slidably fitted, and a key 35 secured to the end of the piston rod 23 protrudes passing through the axial slotted hole to either sides and is retained at the lower portion of the spring bearing 25, whereby the piston rod 23 and the spring bearing 25 are integrally connected with each other. Accordingly, the piston rod 23 and the spring bearing 25 are integrally movable upwards and downwards with respect to the mounting member 28 to the axle. A port 37 which opens in the bottom of a chamber within the vehicle height adjusting cylinder 32 is connected to a pipe joint 38. The spring bearing 25 is axially provided with a slotted hole 39 through which the pipe joint 38 projecting radially from the vehicle height adjusting cylinder 32 extends.

The lid member 33 of the vehicle height adjusting cylinder 32 is provided with a vent hole 40 through which air can escape. Further, in order to fix a position before adjustment in vehicle height and another position after adjustment in vehicle height, two holes 41, 42 are provided on the upper portion of the mounting member 28 to the axle at a distance in the axial direction, while a locking pin 43 which is adapted to fit in the holes 41, 42 are provided on the lower portion of the spring bearing 25. A locking pin 43 is normally energized by a spring 44 so as to fit in the hole 41 or 42.

FIGS. 3 to 5 show a front fork of a motorcycle having a hydraulic type vehicle height adjusting device according to the invention.

An inner tube 52 having a mounting member to the vehicle body at the upper portion is slidably fitted in an outer tube 51 (refer to FIG. 9) having a mounting member to the axle (not shown) at the lower end, while a piston 54 is slidably inserted in a damper cylinder 53 extending upwardly from the bottom of the outer tube 51, and a piston rod 55 further extends upwardly from the piston 54 passing through a rod guide 53a. A suspension spring 56 is arranged between a spring bearing 57 at the upper end of the damper cylinder and a spring bearing 58 fixed to the piston rod 55.

In the hand-operated hydraulic type vehicle height adjusting device 60 for the front fork according to the invention, a lid member 61 screwed into the upper end of the inner tube 52 is formed at the lower portion with a hollow portion, into which a vehicle height adjusting cylinder 62 is screwed from below. A vehicle height adjusting portion 63 is slidably fitted in the vehicle height adjusting cylinder 62. A rod 64 which is threadably connected to the piston rod 55 is threadably engaged with the vehicle height adjusting piston 63, and a spacer ring 65 is inserted in a space between the rod 64 and the lower end portion of the vehicle height adjusting cylinder 62, which is threadably engaged at the lower end by a cap 66.

On the other hand, as shown in FIG. 4, a cylindrical operating member 67 is rotatably fitted in the upper end portion of the lid member 61, and the rod portion 68 of the operating member 67 extending downwards into the vehicle height adjusting cylinder 62 has opposed flat faces as can be seen from FIGS. 4 and 7, and is fitted for axial sliding movement and in a bore at the center of the vehicle height adjusting piston 63 threadably engaged with the upper portion of the rod 64 so that the operating member 67 may be rotated together with the piston 63, said bore having the same shape as the rod portion 68.

In FIG. 8, the vehicle height adjusting piston 63 has an intermediate portion 69 of reduced diameter at the middle of the axial length thereof, and the flange portions 70, 71 above and below the intermediate portion 69 are formed with parallel faces 72, 72' and 73, 73' having the same dimension as the diameter of the above-mentioned intermediate portion 69, respectively. Thus the intermediate portion 69 is formed with opposed grooves 74, 74' having a phase difference of 90° with respect to the flat faces 72, 72', 73, 73'.

Meanwhile, piston stoppers 75 and 76 are arranged on the inner peripheral face of the vehicle height adjusting cylinder 62 so that they protrude inwardly of the same at the upper and lower limit positions between which the piston 63 is moved. Accordingly, at the upper and lower limit positions of the piston 63, the grooves 74, 74' of the piston 63 are formed as engaging portions which are engaged with the piston stoppers 75, 76, and the flat faces 72, 72' and 73, 73' which have the phase difference of 90° with respect to the engaging portion are formed as disengaging portions which are not engaged by the piston stoppers 75, 76.

The rod 64 is provided with a hole 64a of circular cross section in which the rod portion 68 of the operating member enters. As shown in FIGS. 4 and 5, a pipe joint 77 connected to a port 76 which opens into the hydraulic fluid chamber of the cylinder 62 is attached to the upper portion of the lid member 61.

OPERATION

The operation of each of the vehicle height adjusting devices for the rear cushion and the front fork constituted as described above will be explained mainly with reference to FIG. 9.

In the center of FIG. 9, there is a hand-operated hydraulic jack 80. Reference character 81 designates a reservoir tank, 82 a button for releasing the hydraulic fluid lock, 83, 84 check valves, 85 a plunger and 86 a hand-operated lever.

When a motorcycle provided with the vehicle height adjusting devices of the invention is running on the plane streets, the devices of the rear cushion and the front fork are in the respective positions shown in FIGS. 1 and 3. As the motorcycle enters into the running on a waste land, the locking pin 43 of the rear cushion is pulled by a motorcycle rider to unlock the mounting member 28 to the axle side, while the operating member 67 of the front fork is turned through 90° to thereby bring the piston 63 from the engaged position with the slopper pin 76 to the disengaged position to unlock the vehicle height adjusting piston 63. At the same time, the hand-operated lever 86 is moved up and down to move the plunger 85 in reciprocating motion so that fluid such as oil is drawn from the reservoir tank 81 and supplied under pressure on one hand from below into the chamber of the vehicle height adjusting cylinder 32 of the rear cushion and on the other hand from above into the chamber of the vehicle height adjusting cylinder 62 of the front fork. If we consider that the piston rod 23 of the rear cushion is stationary in order to facilitate the understanding, the vehicle height adjusting cylinder 32 is moved downwards to increase the vehicle height from $L_1$ to $L_2$ as shown in FIG. 2. At this time, the locking pin 43 enters into the hole 41 to thereby lock the mounting member 28 to the axle side. At the same time, the hydraulic fluid supplied into the hydraulic fluid chamber of the vehicle height adjusting cylinder 62 of the front fork is also supplied into the chamber below the piston through the two parallel faces 72, 72', 73, 73' formed in the opposed positions of the piston 63 which is threadably engaged with the head of the rod 64, so that the vehicle height adjusting cylinder is subjected to the reaction force corresponding to the sectional area of the rod×oil pressure. If we consider that the piston rod 55, therefore the rod 64 and the vehicle height adjusting piston 63 are stationary, the vehicle height adjusting cylinder 62, therefore, the lid member 61 and the inner tube 52 is raised to thereby increase the vehicle height from $L_1$ to $L_2$ as shown in FIG. 4. At this time, the operating member 67 is turned through 90° to cause the grooves 74, 74' of the piston 63 to engage with the stopper pin 75 so that the vehicle height adjusting cylinder 62 is locked. In both of the vehicle height adjusting devices, since the spring bearings 25, 57 are stationary, the suspension springs 26, 56 each are not displaced, and accordingly the initial preset load remains unchanged. Furthermore, as apparent from the drawings, in both of the devices the stroke is increased by the amount of adjustment in vehicle height, and the dimension of the shock absorber when compressed to the minimum is same before and after adjustment in vehicle height.

In FIG. 9, the respective vehicle height adjusting hydraulic fluid chambers of the rear cushion and the front fork are connected by means of piping, and the vehicle height adjusting piston of the rear cushion which is greater in allotted live load has to take a greater area subjected to pressure than that of the front fork, thereby balancing adjustment of the vehicle height at the front and rear wheels of the motorcycle. Further, a check valve 83 is provided betweewn the reservoir tank 81 and a branch point of a pipe line leading to each of the hydraulic fluid chambers of the vehicle height adjusting cylinders to thereby prevent reverse flow each of the vehicle height adjusting hydraulic fluid chambers.

When lowering the vehicle height, the locking pin 43 of the rear cushion is pulled outwardly and the operating member 67 of the front fork is turned through 90°, thereby unlocking the vehicle height adjusting cylinder, and when the button 82 for releasing hydraulic fluid lock is pushed to open the check valve, hydraulic fluid is forced out by the rider's own weight from within the vehicle height adjusting cylinders 32, 62 and is returned to the reservoir tank 81 through the check valve 83, so that the rear cushion and the front fork are returned to the positions shown in FIGS. 1 and 3, respectively.

What is claimed is:

1. A hydraulic shock absorber for a vehicle comprising a cylinder, a piston slidably fitted within said cylinder, a piston rod connected to said piston and extending out of one end of the cylinder, a first spring bearing engaged with the piston rod, a second spring bearing coupled to said cylinder, a suspension spring interposed between said spring bearings, said shock absorber being attached between a body portion and an axle of said vehicle through a piston rod-member and a cylinder-member, wherein said piston rod-member comprises said first spring bearing, a mounting member for mounting the shock absorber to one of the axle and the body portion, said mounting member being movable in the axial direction relative to said first spring bearing, and mechanical locking means to lock the relative positions between said mounting member and said first spring bearing.

2. A hydraulic shock absorber for a vehicle comprising:
   a damper cylinder;
   a height adjusting cylinder spaced apart from said damper cylinder;
   a first piston slidably fitted within said damper cylinder;
   a second piston slidably fitted within said height adjusting cylinder;
   a piston rod connected to said first and second pistons and extending out one end of said damper cylinder into one end of said height adjusting cylinder;

a first spring bearing connected to said piston rod whereby said first spring bearing and said piston rod are integrally movable;

a second spring bearing connected to said damper cylinder;

a suspension spring interposed between said first and second spring bearings;

a first mounting member for mounting said shock absorber to one of an axle and a body component of said vehicle, said first mounting member being connected to said height adjusting cylinder and movable therewith with respect to said piston rod and said first spring bearing, a second mounting member for mounting said shock absorber to the other of said axle and said body component; and, mechanical locking means operably connected to said first mounting member and said first spring bearing to lock the relative position between said first mounting member and said first spring bearing.

3. A front fork shock absorber for a motorcycle comprising:

a cylinder;

a piston slidably fitted within said cylinder;

a piston rod connected to said piston and extending out one end of said cylinder;

a first spring bearing connected to said piston rod;

a second spring bearing connected to said cylinder;

a suspension spring interposed between said first and second spring bearings;

an inner tube telescopically fitted within an outer tube, said inner tube containing therein said piston rod and said outer tube containing therein said cylinder;

said piston rod being movable axially with respect to said inner tube an said cylinder being fixed with respect to said outer tube;

means on said inner tube for mounting said shock absorber to one of an axle and a body component of said motorcycle;

means on said outer tube for mounting said shock absorber to the other of said axle and said body component; and, mechanical locking means operatively connected to said inner tube and said piston rod to lock said piston rod in position relative to said inner tube.

* * * * *